United States Patent
Zhou et al.

(10) Patent No.: US 8,852,675 B2
(45) Date of Patent: Oct. 7, 2014

(54) PREPARATION METHOD FOR COPPER OXIDE NANOWIRES

(75) Inventors: Mingjie Zhou, Guangdong (CN); Pengrui Shao, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 77 days.

(21) Appl. No.: 13/640,374

(22) PCT Filed: Apr. 23, 2010

(86) PCT No.: PCT/CN2010/072156
§ 371 (c)(1),
(2), (4) Date: Oct. 10, 2012

(87) PCT Pub. No.: WO2011/130923
PCT Pub. Date: Oct. 27, 2011

(65) Prior Publication Data
US 2013/0034652 A1 Feb. 7, 2013

(51) Int. Cl.
B05D 5/12 (2006.01)
C01G 3/02 (2006.01)
C23C 18/06 (2006.01)
B82Y 30/00 (2011.01)
H01J 1/304 (2006.01)
H01J 9/02 (2006.01)

(52) U.S. Cl.
CPC . *C01G 3/02* (2013.01); *C23C 18/06* (2013.01); *B05D 5/12* (2013.01); *B82Y 30/00* (2013.01); *C01P 2004/16* (2013.01); *H01J 1/304* (2013.01); *H01J 9/025* (2013.01)
USPC ......... 427/98.4; 427/99.2; 427/108; 427/197; 427/374.1

(58) Field of Classification Search
USPC ................... 427/98.4, 99.2, 108, 197, 374.1; 977/762, 777, 890
See application file for complete search history.

(56) References Cited

U.S. PATENT DOCUMENTS 7,098,056 B2 * 8/2006 Demers ............................ 438/20
7,485,488 B2 * 2/2009 Han et al. ....................... 438/104

(Continued)

FOREIGN PATENT DOCUMENTS

CN 1674192 A 9/2005
CN 1843932 A * 10/2006

(Continued)

OTHER PUBLICATIONS

Vila, et al.; "Optical and magnetic properties of CuO nanowires grown by thermal oxidation"; Journal of Physics D: Applied Physics; vol. 43, No. 13; 2010.

(Continued)

*Primary Examiner* — Brian K Talbot
(74) *Attorney, Agent, or Firm* — Rosenberg, Klein & Lee

(57) ABSTRACT

The disclosure provides a preparation method for copper oxide nanowires including following steps: step 01, a conductive layer as an electrode is prepared on a clean substrate, or a clean substrate with a conductive layer is provided directly. Step 02, copper powder is weighed up, and the copper powder is homogeneously mixed with organic carrier. Step 03, mixture prepared in step 02 is printed onto the clean substrate with a conductive layer. Step 04, the substrate after being processed by step 03 is sintered under atmosphere having oxygen, and finally cooled to obtain copper oxide nanowires. Adhesion between the copper oxide nanowires prepared in the present disclosure and the substrate is excellent, the copper oxide nanowires may substantially prepared uniformly in large area and under low temperature, technology flow of coating is decreased, a cost of manufacture is decreased, such that a promising method for bottleneck of commercialization process of the field emission device is provided.

11 Claims, 2 Drawing Sheets

(56) References Cited

U.S. PATENT DOCUMENTS

| | | | |
|---|---|---|---|
| 2004/0126649 A1* | 7/2004 | Chen et al. | 429/58 |
| 2004/0147049 A1* | 7/2004 | Lee et al. | 438/20 |
| 2009/0124160 A1* | 5/2009 | Xu | 445/51 |
| 2010/0047523 A1* | 2/2010 | Kim et al. | 428/144 |
| 2010/0079051 A1 | 4/2010 | Kim et al. | |

FOREIGN PATENT DOCUMENTS

CN   100402432   *   7/2008
JP   2010-86966 A   4/2010

OTHER PUBLICATIONS

Communication from the European Patent Office regarding a counterpart foreign application dated Sep. 23, 2013.

* cited by examiner

PREPARATION METHOD FOR COPPER OXIDE NANOWIRES

FIELD OF THE INVENTION

The present disclosure relates to nanomaterials field, and more particularly relates to a preparation method for preparing copper oxide nanowires localizedly in large area by using screen printing technology combined with self-assemble technology.

BACKGROUND OF THE INVENTION

With the progress of time and the development of science and technology, from illuminating with flame to fluorescent illumination, the characters of the illuminations that people required continues rising. However, problems such as worsening environment and shortages of energy are brought out with the rapid and continues development of economy. Therefore, it is a hot research issue that a new light source having advantages of high-efficient, environmental safe, long lifetime, energy-saving is developed to replace traditional light source by each nations. Novel field emission light source which is also called cold cathode light source, having the virtues of environmental safe, energy-saving, light, et al, may be widely applied in various lighting fields, and has great potential. It has important realistic significance in response to national strategy of carbon reducing and energy saving.

Development of field electron emission in cold cathode went through three courses which are Micro-tip, wide band-gap film, and quasi one-dimension nanomaterial in succession. Emission stability of micro-tip cold cathode is not good because the turn-on field is high, mechanical performance, chemical and physical properties are unstable, such as it is easily oxidized, and damaged by ion bombardment. Short lifetime and high manufacture cost restrict the application of this type cold cathode in vacuum electron source device. The people discovered new wide band-gap film cold cathode material had excellent field emission property. It substantially includes diamond and film interrelated. They have the virtues of low surface electron affinities, high heat conductivity, stable chemical and physical properties, unique ultra-high hardness, and easily achieve preparation in large area, and these favor the application in field electron emission display. However, shortcomings of film cold cathode that it is difficult to prepare evenly in large area, and the turn-on electric field is high, restrict the application process.

It should be understood from the foregoing that it is difficult to commercially apply any one of the micro-tip matrix cold cathode or the film cold cathode widely. Quasi one-dimension nanomaterial, which develop simultaneously with the film cold cathode, became research hot point in field electron emission field because of their unique geometry, stable chemical and physical properties and excellent field electron emission property, and it is a breakthrough of the commercially application of the big size field electron emission device. Carbon nanotubes as a typical Quasi one-dimension structure, have $10^3 \sim 10^4$ times electric field enhancement while applied in cold cathode of field electron emission device and tips of carbon nanotubes. According to research, carbon nanotubes have stable chemical and physical properties, excellent electric current field emission property, and capability to endure super large emission electric current density. Because the growing temperature of the carbon nanotubes is higher than softening temperature, the carbon nanotubes may be only grown on heat-resistant substrate, and the manufacture cost is high, it is difficult to grow carbon nanotubes in large area on glass directly. So, people prepared carbon nanotubes firstly, then the carbon nanotubes are printed on the glass substrate by screen printing to make the applications of the carbon nanotubes popularized. The carbon nanotubes printed on the glass substrate are easily to detach from the substrate, and emission is uneven and unstable. People selected metal particulates and oxide particulates as filler to solve the problem of adhesion between the carbon nanotubes and the substrate, and uneven emission. At present, it could solve problem of adhesion between the carbon nanotubes and the substrate at same level, however it is difficult to solve the problems of uneven and unstable emission. This is due to electricity conductive properties of carbon nanotubes and emission properties of field electrons are different due to the different geometric structures (height, diameter and chirality), and it is adverse to the application of the carbon nanotubes in the vacuum micro-electron device. According to prior art, it is difficult to prepare carbon nanotubes in large area which have uniform heights, diameters, and chiralities.

SUMMARY OF THE INVENTION

Technical problem that the present disclosure will solve is to provide a preparation method which is low cost, simple, easily to prepare copper oxide nanowires in large area, to solve the problems of uniformity of the deposited film is hard to control and the equipment using is expensive.

The technical solution to solve the technical problem of the present disclosure is: providing a preparation method for copper oxide nanowires, including following steps:

Step 1, a conductive layer as an electrode is prepared on a clean substrate, or a clean substrate with a conductive layer is provided directly.

step 2, copper powder is weighed up, and the copper powder is homogeneously mixed with organic carrier.

step 3, mixture prepared in step 02 is printed onto the clean substrate with the conductive layer.

step 4, the substrate after being processed by step 03 is sintered under atmosphere having oxygen, and finally cooled to obtain copper oxide nanowires.

In preparation method of the present disclosure, step 01 further includes: the clean substrate is dried or blow-dried with inert gas.

In preparation method of the present disclosure, in step 01, the substrate may be glass, ceramics, silicon chip, metal.

In preparation method of the present disclosure, the conductive layer of step 01 may be an ITO transparent conductive layer, a metal opaque conductive layer or a composite conductive layer. The conductive layer has a thickness in a range of 20 nm~200 μm.

In preparation method of the present disclosure, the copper powder in step 2 has a diameter in a range of 20 nm~300 μm.

In preparation method of the present disclosure, copper layer formed in step 3 by printing has a thickness in a range of 4 μm~500 μm, the printing process of step 3 is screen printing process.

In preparation method of the present disclosure, temperature of the sintering process is in a range of 350° C.~650° C.

In preparation method of the present disclosure, time of the sintering process is in a range of 15 min~480 min.

Compared with the prior art, the present disclosure may achieve preparation of copper oxide nanowires which grow in large area on glass substrate easily to form cold cathode. Adhesion between the copper oxide nanowires and the substrate is excellent, the copper oxide nanowires may substantially be prepared uniformly in large area and under low temperature, technology flow of coating is decreased, cost of manufacture is decreased, such that a promising method for breaking bottleneck of commercialization process of the field emission device is provided.

BRIEF DESCRIPTION OF THE DRAWINGS

The present disclosure is explained in detail according to embodiments with reference and drawings, in the drawings.

DETAILED DESCRIPTION

In order to make the purpose, the technical solutions and benefits of the present disclosure more clearly, the present disclosure is explained in detail according to the following embodiments with reference and the accompanying drawings. It should be understood that the following embodiments is only to explain the present disclosure, not used to limit the present disclosure.

The present disclosure provides a preparation method for copper oxide nanowires which easily grow in large area, the preparation method includes following steps:

Step 01, a conductive layer as an electrode is prepared on a clean substrate, or a clean substrate with a conductive layer is provided.

Step 02, copper powder is weighed up, and the copper powder is homogeneously mixed with organic carrier.

Step 03, mixture prepared in step 02 is printed on the clean substrate with a conductive layer.

Step 04, the substrate after being processed by step 03 is sintered under atmosphere having oxygen, and finally cooled to obtain copper oxide nanowires.

In the preparation method of the present disclosure, the copper powder may be bought from manufacture directly, and the copper powder of step 02 has a diameter in a range of 20 nm~300 µm, the copper powder has a diameter according to need may be used alternatively. Step 01 further includes: the clean substrate is dried or blow-dried with inert gas. The substrate of step 01 may be glass, ceramics, silicon chip, metal, et al., and geometry of the substrate is without any limitation. The conductive layer of step 01 may be an ITO transparent conductive layer, a metal opaque conductive layer or a composite conductive layer, shape and size of the electrode formed by the conductive layer are without any limitation, may be strip-shaped, ring-shaped, et al. The conductive layer has a thickness in a range of 20 nm~200 µm. In step 03, copper layer formed by screen printing has a thickness in a range of 4 µm~500 µm, graphics of the copper layer is without any limitation, and may be designed according to need, the organic carrier is burnt off when sintering the substrate to grow the copper oxide nanowires. In step 04, temperature of the sintering process is in a range of 350° C.~650° C. In step 04, time of the sintering process is in a range of 15 min~480 min.

The copper oxide nanowires prepared by the preparation method in the present disclosure may be applied in vacuum electron source matrix, such as cold cathode light source, field emission flat panel display, photoelectric transition device, or solar battery.

Figure 1:
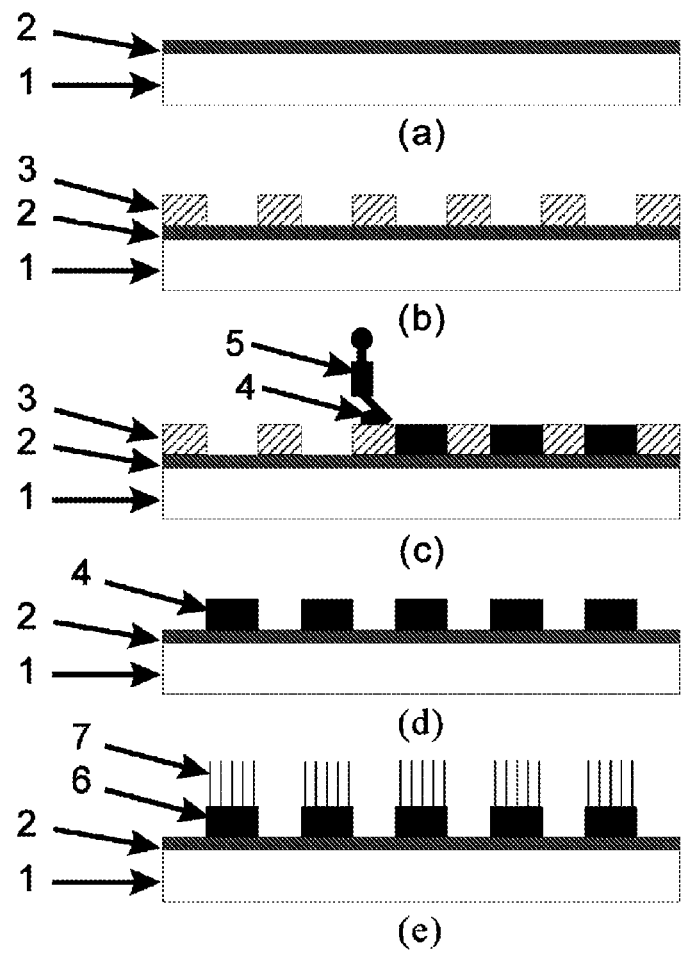
FIG. 1 is a schematic view of a preparation method for copper oxide nanowires of the present disclosure.

In order to make growing process of the copper oxide nanowires which easily grow in large area more clearly, the present disclosure is detailed explained with FIG. 1 in specific steps, while the substrate is glass, the copper oxide nanowires which grow in large area by screen printing and thermal oxidizing.

Step 1, a conductive layer is prepared on a substrate. A conductive layer 2 is prepared on a clean glass substrate by using film preparation technique, as shown in FIG. 1(a). Referring to FIG. 1(a), the conductive layer 2 is made of metal, such as Cr, Al, conductive silver starch, et al, also may be nonmetals such as ITO. The conductive layer 2 has a thickness in a range of 20 nm~200 µm. The conductive layer formed may be plate-shaped, or strip-shaped.

Step 2, copper powder is screen printed. Firstly, the copper powder having a diameter in a range of 20 nm~300 µm is weighed up, then the copper powder is homogeneously mixed with organic carrier. As shown is FIG. 1(b), a screen 3 designed according to requirement is fitted on a screen printing machine (not shown), tilt angle and force of the scraper 5 as shown in FIG. 1(c) are adjusted, mixture 4 containing copper powder is poured on the screen 3 and printed. Finally, as shown in FIG. 1(c), copper source is prepared on the substrate localizedly.

Step 3, the copper source printed is heated and oxidized to remove the organic carrier. The copper powder prepared on the substrate is thermal oxidized under air, oxygen, or atmosphere which comprising oxygen, temperature of thermal oxidization is in a range of 350° C.~650° C., time of constant-temperature heating is in a range of 15 min~480 min, finally, finally cooled naturally. As shown in FIG. 1(e), the copper powder forms copper oxide layer 6, and copper oxide nanowires are grown on surface of the copper oxide layer by fully thermal oxidizing. At the same time, the organic carrier mixed when printing the copper source are totally oxidative decomposed.

Figure 2:
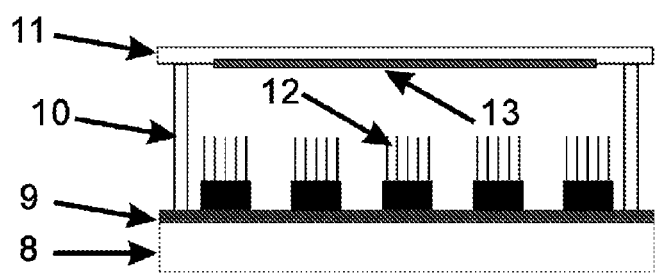
FIG. 2 is a schematic view of a field emission device including a secondary structure of electron source matrix using copper oxide nanowires grown localizedly of an embodiment of the present disclosure.
Figure 3:
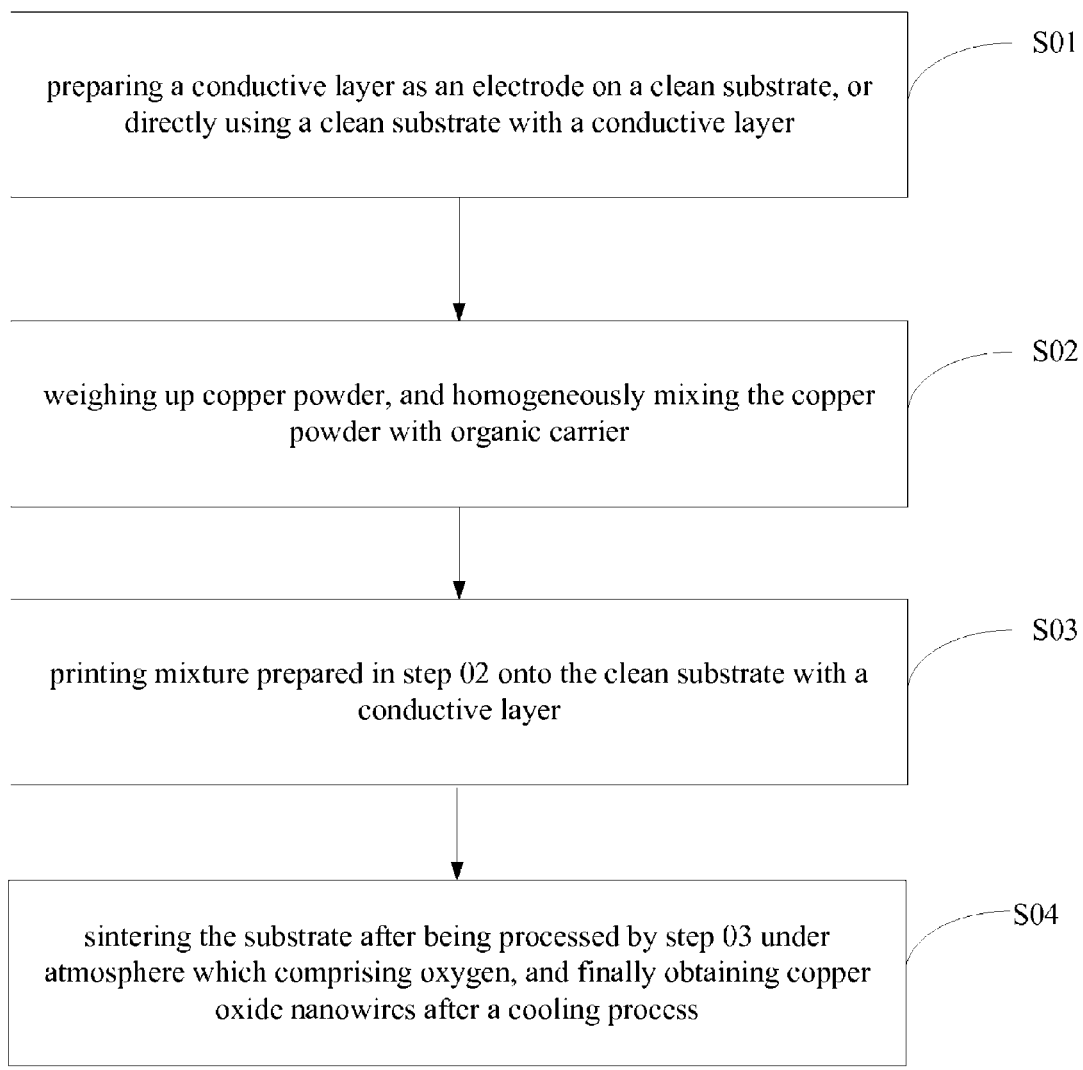
FIG. 3 is a flow chart of a preparation method for copper oxide nanowires of the present disclosure.

The copper oxide nanowires prepared by the preparation method in the disclosure may be applied in vacuum electron source matrix, such as cold cathode light source, field emission flat panel display, photoelectric transition device, or solar battery. FIG. 2 shows a schematic view of a field emission device including a secondary structure of electron source matrix using copper oxide nanowires grown localizedly. 8 is substrate, 9 is cathode of the device, 10 is insulation member, 11 is anode, 12 are copper oxide nanowires, 13 is fluorescent powder. The device may be applied in field emission light source, also may be used as field emission flat panel display.

A plurality of examples are described to illustrate the preparation method for copper oxide nanowires under different conditions.

EXAMPLE 1

A process of preparing copper oxide nanowires on a substrate which is a ITO glass is illustrated.

Size of the glass is 40 mm×50 mm×3 mm. Graphics printed on the ITO glass is a square having a size of 25 mm×25 mm. Firstly, 7 g of organic carrier weighted up is poured in to a flask having a capacity of 10 ml, then 21 g of copper powder with purity is 99.9%, and having a diameter of 20 µm. Secondly, the organic carrier is stirred by a mixer, and at the same time the copper powder is gradually added to the organic carrier, keep stirring for 24 hours. Thirdly, the ITO glass is put into acetone, ethanol, and deionized water in turn to ultrasonic clean for 15 minutes, then dried or blow-dried with inert gas. The preparation process shown in FIG. 1 is employed, mixture containing copper powder is screen printed on the ITO glass to form a layer having a thick of 40 μm. Copper powder matrix printed on the ITO glass is put into a heating furnace, temperature is increased to 450° C. with a heating rate of 15° C./min, the temperature is retained for 180 minutes, finally cooled naturally to form copper oxide nanowires.

EXAMPLE 2

A process of preparing copper oxide nanowires on a substrate which is common glass is illustrated.

Size of the glass is 60 mm×60 mm×1.1 mm. Graphics printed on the glass is circular having a diameter of 30 mm. Firstly, 8 g of organic carrier weighted up is poured in to a flask having a capacity of 10 ml, then 28 g of copper powder with purity is 99.9%, and having a diameter of 20 μm. Secondly, the organic carrier is stirred by a mixer, and at the same time the copper powder is gradually added to the organic carrier, keep stirring for 24 hours. Thirdly, the glass is put into acetone, ethanol, and deionized water in turn to ultrasonic clean for 15 minutes, then dried or blow-dried with inert gas. The preparation process shown in FIG. 1 is employed, a chrome layer having a thickness of 2 μm as a conductive layer is deposited on the glass by a magnetron sputtering equipment. Mixture containing copper powder is screen printed on the chrome layer to form a layer having a thick of 4 μm. Copper powder matrix printed on the glass is put into a heating furnace, temperature is increased to 650° C. with a heating rate of 15° C./min, the temperature is retained for 15 minutes, finally cooled naturally to form copper oxide nanowires.

EXAMPLE 3

A process of preparing copper oxide nanowires on a substrate which is ceramics sheet is illustrated.

Size of the ceramics sheet is 50 mm×60 mm×1 mm. Graphics printed on the ceramics sheet is rectangular having a size of 25 mm×40 mm. Firstly, 10 g of organic carrier weighted up is poured in to a flask having a capacity of 10 ml, then 28 g of copper powder with purity is 99.9%, and having a diameter of 300 μm. Secondly, the organic carrier is stirred by a mixer, and at the same time the copper powder is gradually added to the organic carrier, keep stirring for 24 hours. Thirdly, the ceramics sheet is put into acetone, ethanol, and deionized water in turn to ultrasonic clean for 15 minutes, then dried or blow-dried with inert gas. The preparation process shown in FIG. 1 is employed, conductive silver starch is screen printed on the ceramics sheet to form a entirely conductive layer having a thickness of 200 μm. Mixture containing copper powder is screen printed on the conductive layer to form a layer having a thick of 500 μm. Copper powder matrix printed on the ceramics sheet is put into a heating furnace, temperature is increased to 350° C. with a heating rate of 15° C./min, the temperature is retained for 480 minutes, finally cooled naturally to form copper oxide nanowires.

The present disclosure may achieve preparation of copper oxide nanowires which grow in large area on glass substrate easily to form cold cathode. Adhesion between the copper oxide nanowires and the substrate is excellent, the copper oxide nanowires may be prepared uniformly in large area and under low temperature, technology flow of coating is decreased, cost of manufacture is decreased, and a promising method for breaking bottleneck of commercialization process of the field emission device is provided.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A preparation method for copper oxide nanowires, comprising:
   step 1, preparing a conductive layer as an electrode on a clean substrate, or directly providing a clean substrate with a conductive layer;
   step 2, weighing up a predetermined amount of copper powder, and homogeneously mixing the copper powder with a predetermined amount of organic carrier sufficient to result in a printable homogenous mixture;
   step 3, screen printing the homogenous mixture prepared in step 2 on the clean substrate with a conductive layer; and
   step 4, sintering the substrate after being processed by step 3 under atmosphere having oxygen to substantially oxidatively decompose the organic carrier to deposit the sintered copper in direct contact with the conductive layer devoid of an adhesive binding agent, and obtaining copper oxide nanowires after a cooling process.

2. The preparation method for copper oxide nanowires according to claim 1, wherein step 1 further comprises:
   drying the clean substrate or blow-drying the clean substrate by inert gas.

3. The preparation method for copper oxide nanowires according to claim 1, wherein the clean substrate of step 1 is selected from the group of: ceramics, or silicon chip or metal.

4. The preparation method for copper oxide nanowires according to claim 1, wherein the conductive layer of step 1 is an ITO transparent conductive layer, a metal opaque conductive layer or a composite conductive layer.

5. The preparation method for copper oxide nanowires according to claim 1, wherein the conductive layer has a thickness in a range of 20 nm~200 μm.

6. The preparation method for copper oxide nanowires according to claim 4, wherein the conductive layer has a thickness in a range of 20 nm~200 μm.

7. The preparation method for copper oxide nanowires according to claim 1, wherein the copper powder in step 2 has a diameter in a range of 20 nm~300 μm.

8. The preparation method for copper oxide nanowires according to claim 1, wherein copper layer formed in step 3 has a thickness in a range of 4 μm~500 μm.

9. The preparation method for copper oxide nanowires according to claim 1, wherein the printing process of step 3 is screen printing process using a selectively oriented scraper.

10. The preparation method for copper oxide nanowires according to claim 1, wherein in step 4, temperature of the sintering process is in a range of 350° C.~650° C.

11. The preparation method for copper oxide nanowires according to claim 1, wherein in step 4, time of the sintering process is in a range of 15 min~480 min.

* * * * *